(12) United States Patent
Gu et al.

(10) Patent No.: US 11,956,906 B2
(45) Date of Patent: Apr. 9, 2024

(54) BACKBOARD SUPPORT STRUCTURE, PREPARATION METHOD THEREFOR, AND THE DISPLAY DEVICE

(71) Applicant: BOE Technology Group Co., Ltd., Beijing (CN)

(72) Inventors: Penghao Gu, Beijing (CN); Chunyan Xie, Beijing (CN); Shiming Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 225 days.

(21) Appl. No.: 16/955,442

(22) PCT Filed: Jul. 30, 2019

(86) PCT No.: PCT/CN2019/098421
§ 371 (c)(1),
(2) Date: Jun. 18, 2020

(87) PCT Pub. No.: WO2021/016879
PCT Pub. Date: Feb. 4, 2021

(65) Prior Publication Data
US 2022/0141967 A1     May 5, 2022

(51) Int. Cl.
*H05K 5/00*     (2006.01)
*B32B 3/30*     (2006.01)
(Continued)

(52) U.S. Cl.
CPC ............ *H05K 5/0017* (2013.01); *B32B 3/30* (2013.01); *B32B 7/022* (2019.01); *B32B 7/12* (2013.01);
(Continued)

(58) Field of Classification Search
CPC .. G09F 9/301; G06F 1/1652; G02F 1/133305; B32B 17/10; B32B 2255/10;
(Continued)

(56) References Cited

U.S. PATENT DOCUMENTS 10,198,038 B2    2/2019    Jang et al.
10,868,265 B2   12/2020    Gu et al.
(Continued)

FOREIGN PATENT DOCUMENTS

CN      106875845 A     6/2017
CN      106952887 A     7/2017
(Continued)

OTHER PUBLICATIONS merriam-webster.com/dictionary/backboard accessed Jul. 18, 2020.*
(Continued)

*Primary Examiner* — Alicia J Weydemeyer
(74) *Attorney, Agent, or Firm* — Banner & Witcoff, Ltd.

(57) ABSTRACT

Provided are a backboard support structure, a preparation method therefor, and a display device. The display device includes a display substrate and a backboard support structure; the backboard support structure includes a substrate support film and an adhesive layer arranged in a laminated manner. The backboard support structure is bonded to the non-display side of the display substrate via the adhesive layer, and includes a first bendable region and a first non-bent region. The adhesive layer includes a first portion located in the first bendable region and a second portion located in the first non-bent region; the first portion has a modulus of elasticity of about 1 Kpa-150 Kpa, the second portion has a modulus of elasticity of about 150 Kpa-250 Kpa, and the substrate support film has a modulus of elasticity of about 1 Gpa-10 Gpa.

17 Claims, 9 Drawing Sheets

(51) Int. Cl.
  *B32B 7/022* (2019.01)
  *B32B 7/12* (2006.01)
  *B32B 17/10* (2006.01)
  *B32B 27/08* (2006.01)
  *B32B 27/28* (2006.01)
  *B32B 27/36* (2006.01)
(52) U.S. Cl.
  CPC .............. *B32B 17/10* (2013.01); *B32B 27/08* (2013.01); *B32B 27/281* (2013.01); *B32B 27/36* (2013.01); *B32B 2255/10* (2013.01); *B32B 2307/51* (2013.01); *B32B 2307/732* (2013.01); *B32B 2457/20* (2013.01)
(58) Field of Classification Search
  CPC .......... B32B 2307/51; B32B 2307/732; B32B 2457/20; B32B 27/08; B32B 27/281; B32B 27/36; B32B 3/30; B32B 7/022; B32B 7/12; B32B 17/06; B32B 2307/42; B32B 2307/546; B32B 2379/08; B32B 2457/206; B32B 5/142
  See application file for complete search history.

(56) References Cited

U.S. PATENT DOCUMENTS

| | | | | |
|---|---|---|---|---|
| 2014/0295150 | A1* | 10/2014 | Bower | C09J 5/00 428/411.1 |
| 2015/0070601 | A1* | 3/2015 | Lin | G02F 1/13338 349/12 |
| 2017/0338182 | A1* | 11/2017 | Gross | H01L 23/15 |
| 2018/0315953 | A1* | 11/2018 | Hu | G02F 1/133308 |
| 2018/0366679 | A1* | 12/2018 | Kim | B32B 3/30 |
| 2020/0266367 | A1 | 8/2020 | Wang et al. | |
| 2022/0006044 | A1 | 1/2022 | Yan | |

FOREIGN PATENT DOCUMENTS

| | | |
|---|---|---|
| CN | 108597378 A | 9/2018 |
| CN | 108806515 A | 11/2018 |
| CN | 109377887 A | 2/2019 |
| CN | 109473046 A | 3/2019 |
| CN | 109903679 A | 6/2019 |
| KR | 20170063344 A | 6/2017 |
| KR | 20170072973 A | 6/2017 |
| WO | 2010074748 A1 | 7/2010 |
| WO | 2019087938 A1 | 5/2019 |

OTHER PUBLICATIONS

Liu, Zheng-zhou, et al., "Stress Simulation of Foldable OLED Screen Bending", Article No. 1007-2780 (2018)-7-0555-06, vol. 33, Iss. 7, Chinese Journal of Liquid Crystals and Displays, Jul. 2018.
Feb. 22, 2022—(CN) First Office Action Appn 201980001187.8 with English Translation.
Jul. 6, 2022—(EP) Extended European Search Report Appn 19933219.8.

* cited by examiner

BACKBOARD SUPPORT STRUCTURE, PREPARATION METHOD THEREFOR, AND THE DISPLAY DEVICE

This application is a U.S. National Phase Entry of International Application No. PCT/CN2019/098421 filed on Jul. 30, 2019, designating the United States of America. The present application claims priority to and the benefit of the above-identified application and the above-identified application is incorporated by reference herein in its entirety.

TECHNICAL FIELD

Embodiments of the present disclosure relate to a backboard support structure, a preparation method therefor, and a display device.

BACKGROUND

A display panel typically comprises a display substrate, a backboard support structure disposed on the non-display side of the display substrate, and a transparent cover plate disposed on the display side of the display substrate, etc. The backboard support structure can support and protect the display substrate. When the display panel is a flexible display panel, the backboard support structure can further provide a certain mechanical buffer and protection for the bending of the flexible display panel so as to avoid damages to the flexible display panel during the bending process.

SUMMARY

At least an embodiment of the present disclosure provides a display device comprising a display substrate and a backboard support structure, wherein the backboard support structure comprises a substrate support film and an adhesive layer arranged in a laminated manner and bonded to the non-display side of the display substrate via the adhesive layer. The backboard support structure comprises a first bendable region and a first non-bent region, and the adhesive layer comprises a first portion located in the first bendable region and a second portion located in the first non-bent region. The first portion has a modulus of elasticity of about 1 Kpa-150 Kpa, the second portion has a modulus of elasticity of about 150 Kpa-250 Kpa, and the substrate support film has a modulus of elasticity of about 1 Gpa-10 Gpa. The display substrate is a foldable display substrate having a second bendable region and a second non-bent region; wherein the first bendable region and the second bendable region are correspondingly arranged in a laminated manner, and the first non-bent region and the second non-bent region are correspondingly arranged in a laminated manner.

For instance, in the display device provided in at least an embodiment of the present disclosure, the substrate support film has a thickness of about 20 μm-60 μm, and the adhesive layer has a thickness of about 10 μm-50 μm.

For instance, in the display device provided in at least an embodiment of the present disclosure, the substrate support film has an elongation at break of about 5%-80%.

For instance, in the display device provided in at least an embodiment of the present disclosure, the substrate support film has a bending strength of greater than about 160 Mpa.

For instance, in the display device provided in at least an embodiment of the present disclosure, the substrate support film has a moisture absorption of lower than about 2%.

For instance, in the display device provided in at least an embodiment of the present disclosure, the material of the substrate support film comprises polyimide or PET.

For instance, in the display device provided in at least an embodiment of the present disclosure, the material of the adhesive layer comprises an acrylate-based adhesive.

For instance, in the display device provided in at least an embodiment of the present disclosure, the first non-bent region comprises a first non-bent sub-region and a second non-bent sub-region, wherein the first bendable region is located between the first non-bent sub-region and the second non-bent sub-region. The second non-bent region comprises a third non-bent sub-region and a fourth non-bent sub-region, wherein the second bendable region is located between the third non-bent sub-region and the fourth non-bent sub-region. The first non-bent sub-region and the third non-bent sub-region are correspondingly arranged in a laminated manner, and the second non-bent sub-region and the fourth non-bent sub-region are correspondingly arranged in a laminated manner.

At least an embodiment of the present disclosure provides a backboard support structure comprising a substrate support film and an adhesive layer arranged in a laminated manner; wherein the substrate support film has a modulus of elasticity of about 1 Gpa-10 Gpa, and the adhesive layer has a modulus of elasticity of about 1 Kpa-250 Kpa.

For instance, in the backboard support structure provided in at least an embodiment of the present disclosure, the substrate support film has a thickness of about 20 μm-60 μm, and the adhesive layer has a thickness of about 10 μm-50 μm.

For instance, in the backboard support structure provided in at least an embodiment of the present disclosure, the substrate support film has an elongation at break of about 5%-80%, the substrate support film has a bending strength of greater than about 160 Mpa, and the substrate support film has a moisture absorption of lower than about 2%.

For instance, in the backboard support structure provided in at least an embodiment of the present disclosure, the substrate support film has a modulus of elasticity of about 5 Gpa-10 Gpa and a thickness of about 20 μm-40 μm; and the adhesive layer has a modulus of elasticity of about 150 Kpa-250 Kpa and a thickness of about 10 μm-20 μm.

For instance, in the backboard support structure provided in at least an embodiment of the present disclosure, the substrate support film has a modulus of elasticity of about 1 Gpa-5 Gpa and a thickness of about 40 μm-60 μm; and the adhesive layer has a modulus of elasticity of about 1 Kpa-150 Kpa and a thickness of about 20 μm-50 μm.

For instance, in the backboard support structure provided in at least an embodiment of the present disclosure, the substrate support film has a modulus of elasticity of about 1 Gpa-5 Gpa and a thickness of about 40 μm-60 μm; and the adhesive layer has a modulus of elasticity of about 1 Kpa-150 Kpa and a thickness of about 10 μm-20 μm.

For instance, in the backboard support structure provided in at least an embodiment of the present disclosure, the substrate support film has a modulus of elasticity of about 5 Gpa-10 Gpa and a thickness of about 40 μm-60 μm; and the adhesive layer has a modulus of elasticity of about 150 Kpa-250 Kpa and a thickness of about 10 μm-20 μm.

For instance, in the backboard support structure provided in at least an embodiment of the present disclosure, the backboard support structure comprises a first bendable region and a first non-bent region, and the adhesive layer comprises a first portion located in the first bendable region and a second portion located in the first non-bent region;

wherein the modulus of elasticity of the first portion is lower than the modulus of elasticity the modulus of elasticity of the second portion.

For instance, in the backboard support structure provided in at least an embodiment of the present disclosure, the first portion has a modulus of elasticity of about 1 Kpa-150 Kpa, and the second portion has a modulus of elasticity of about 150 Kpa-250 Kpa.

For instance, in the backboard support structure provided in at least an embodiment of the present disclosure, the backboard support structure comprises a body region and a peripheral region, and the adhesive layer comprises a third portion located in the body region and a fourth portion located in the peripheral region; wherein the modulus of elasticity of the third portion is lower than the modulus of elasticity of the fourth portion.

For instance, in the backboard support structure provided in at least an embodiment of the present disclosure, the third portion has a modulus of elasticity of about 1 Kpa-150 Kpa, and the fourth portion has a modulus of elasticity of about 150 Kpa-250 Kpa.

For instance, in the backboard support structure provided in at least an embodiment of the present disclosure, the backboard support structure comprises a first bendable region, a first non-bent region, a body region, and a peripheral region; wherein the peripheral region is located in the first non-bent region, and the body region is located in the regions of the first bendable region and the first non-bent region other than the peripheral region. The adhesive layer comprises a first portion located in the first bendable region, a fourth portion located in the peripheral region, and regions other than the first portion and the fourth portion. The first portion has a modulus of elasticity of about 1 Kpa-150 Kpa, the fourth portion has a modulus of elasticity of about 150 Kpa-250 Kpa, and the regions of the adhesive layer other than the first portion and the fourth portion has a modulus of elasticity of about 1 Kpa-250 Kpa.

For instance, in the backboard support structure provided in at least an embodiment of the present disclosure, the backboard support structure comprises a body region and a peripheral region. The backboard support structure further comprises a spacing layer, wherein the spacing layer is located between the adhesive layer and the substrate support film, and comprises a protrusion structure located in the peripheral region and protruding towards the adhesive layer. The surface of the adhesive layer away from the spacing layer is a flat surface.

For instance, in the backboard support structure provided in at least an embodiment of the present disclosure, the spacing layer has a modulus of elasticity of about 1 Gpa-4 Gpa.

For instance, in the backboard support structure provided in at least an embodiment of the present disclosure, the substrate support film has a thickness of about 20 μm-60 μm, the adhesive layer has a thickness of about 20 μm-40 μm, and the protrusion structure has a protrusion height of about 10 μm-20 μm.

At least an embodiment of the present disclosure provides a display device comprising a display substrate and any one of the backboard support structures as described above, wherein the backboard support structure is bonded to the non-display side of the display substrate via adhesive layer.

At least an embodiment of the present disclosure further provides a method of preparing a backboard support structure comprising providing a substrate support film, and forming an adhesive layer on the substrate support film, wherein the substrate support film has a modulus of elasticity of about 1 Gpa-10 Gpa, and the adhesive layer has a modulus of elasticity of about 1 Kpa-250 Kpa.

For instance, in the preparation method provided at least an embodiment of the present disclosure, the backboard support structure comprises a first bendable region and a first non-bent region, and the adhesive layer comprises a first portion located in the first bendable region and a second portion located in the first non-bent region, wherein the method further comprises subjecting at least one of the first portion and the second portion to a modification treatment so that the modulus of elasticity of the first portion is lower than the modulus of elasticity the modulus of elasticity of the second portion.

For instance, in the preparation method provided at least an embodiment of the present disclosure, the backboard support structure further comprises a body region and a peripheral region, and the adhesive layer further comprises a third portion located in the body region and a fourth portion located in the peripheral region, wherein the method further comprises subjecting at least one of the third portion and the fourth portion to a modification treatment so that the modulus of elasticity of the third portion is lower than the modulus of elasticity of the fourth portion.

For instance, in the preparation method provided at least an embodiment of the present disclosure, the modification treatment is performed by means of UV radiation.

For instance, in the preparation method provided at least an embodiment of the present disclosure, the backboard support structure further comprises a body region and a peripheral region, wherein the method further comprises forming a spacing layer on the substrate support film prior to the formation of the adhesive layer, wherein the spacing layer comprises a protrusion structure located in the peripheral region. The adhesive layer is formed on the side of the spacing layer away from the substrate support film, and the surface of the adhesive layer away from the spacing layer is formed to a flat surface.

For instance, in the preparation method provided at least an embodiment of the present disclosure, the spacing layer is formed by means of thermo compression molding.

For instance, in the preparation method provided at least an embodiment of the present disclosure, the thermo compression molding is performed at a temperature of about 200° C.-300° C. and a pressure of about 0.8 N-1.0N for a time period of about 10 s-30 s.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2A;

DETAILED DESCRIPTION

Figure 1A:
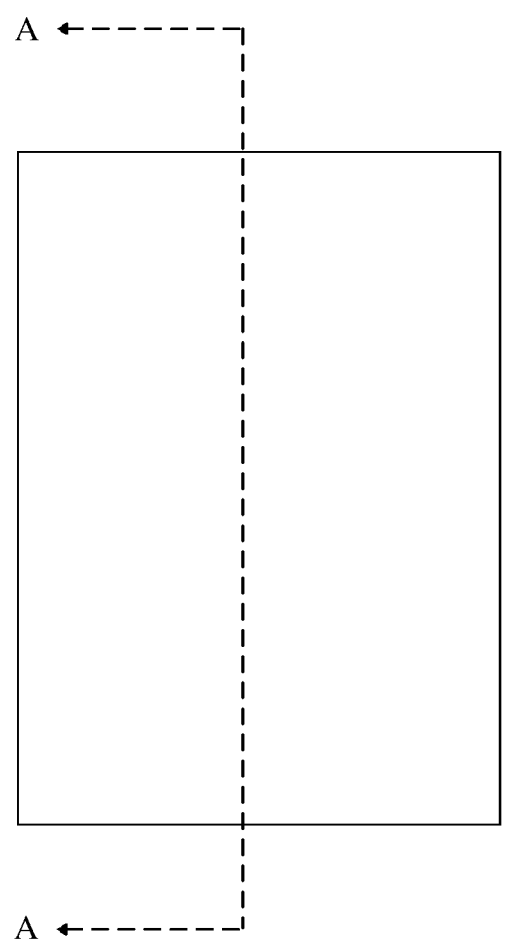
FIG. 1A is a planar schematic view of a backboard support structure provided in at least an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As described above, when the display panel is a flexible the display panel, the backboard support structure can provide a certain mechanical buffer and protection for the bending of the flexible display panel so as to avoid damages to the flexible display panel during bending. For instance, when the display panel has a relatively small bending radius, the backboard support structure need to have certain mechanical properties, e.g., good bending recovery, resistance to deformation, bending strength, and the like, thereby ensuring the reliability of the display panel. Similarly, when the display panel is a foldable display panel, the mechanical properties of the backboard support structure play an important role in the folding process of the foldable display panel. To improve the reliability of the foldable display panel, a reasonable design of the backboard support structure is required to allow it to fully alleviate the force generated by the foldable display panel during the bending process, thereby avoiding the damages to the foldable display panel during the bending process.

At least an embodiment of the present disclosure provides a backboard support structure comprising a substrate support film and an adhesive layer that are arranged in a laminated manner; the substrate support film has a modulus of elasticity of 1 Gpa-10 Gpa, and the adhesive layer has a modulus of elasticity of 1 Kpa-250 Kpa.

At least an embodiment of the present disclosure provides a display device comprising a display substrate and the above-described backboard support structure; the backboard support structure is bonded to the non-display side of the display substrate via adhesive layer.

Hereinafter, the backboard support structure and the preparation method therefor, as well as the display device provided in embodiments of the present disclosure, are described in details by some specific examples.

At least an embodiment of the present disclosure provides a backboard support structure. FIG. 1A is a planar schematic view of the backboard support structure, and FIG. 1B is a cross-sectional schematic view along the line A-A of the backboard support structure as shown in FIG. 1A.

Figure 1B:
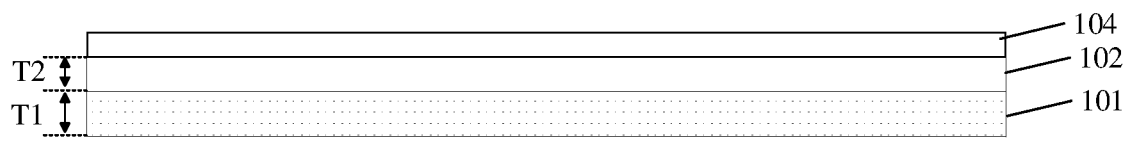
FIG. 1B is a cross-sectional schematic view along the line A-A of the backboard support structure as shown in FIG. 1A.

As shown in FIG. 1A and FIG. 1B, the backboard support structure comprises a substrate support film 101 and an adhesive layer 102 that are arranged in a laminated manner. The adhesive layer 102 is used to bind the backboard support structure to a side of a device, e.g., the display substrate, so as to provide support and protection. For instance, the adhesive layer 102 can completely cover the surface of the substrate support film 101 (as shown in FIGS. 1A-1B, the adhesive layer 102 completely covers the upper surface of the substrate support film 101). Alternatively, in some examples, the adhesive layer 102 can also cover a portion of the surface of the substrate support film 101.

For instance, the substrate support film 101 can have a modulus of elasticity of about 1 Gpa-10 Gpa. If the modulus of elasticity of the substrate support film 101 is lower than about 1 Gpa, the substrate support film 101 will be difficult to provide sufficient support and protection; and if the modulus of elasticity of the substrate support film 101 is greater than about 10 Gpa, it is not beneficial to the bending operation of the substrate support film 101 or the like. For instance, in some examples, the modulus of elasticity of the substrate support film 101 can be selected as 2 Gpa-8 Gpa, e.g., 4 Gpa, 5 Gpa, 6 Gpa or 7 Gpa, and the like. Meanwhile, the substrate support film 101 can achieve the balance among various properties so as to have a better comprehensive performance.

For instance, the adhesive layer 102 can have a modulus of elasticity of about 1 Kpa-250 Kpa. If the modulus of elasticity of the adhesive layer 102 is lower than about 1 Kpa, the adhesive layer 102 is prone to produce unnecessary deformation, e.g., collapse, etc., so that it is hard to maintain the desired shape; and if the modulus of elasticity of the adhesive layer 102 is greater than about 250 Kpa, it is not beneficial to the coordination of the adhesive layer 102 with the substrate support film 101 for bending operation, and the like. For instance, in some examples, the modulus of elasticity of the adhesive layer 102 can be selected as 10 Kpa-150 Kpa, e.g., 50 Kpa, 80 Kpa, 120 Kpa or 150 Kpa, etc. Meanwhile, the adhesive layer 102 can achieve the balance among various properties so as to have a better comprehensive performance.

It should be noted that the term "about" as used in the embodiments of the present disclosure means that the value allows a certain error range, e.g., the error range is within the range of ±5% of the value. For instance, when a value is about 100, all the values in the range of 95-105 are encompassed in the range of aforesaid value.

With the coordination of the substrate support film 101 and the adhesive layer 102 having the aforesaid modulus of elasticity, the backboard support structure as a whole has good mechanical properties, e.g., good bending recovery, resistance to deformation, bending strength, and the like. Thus, when the backboard support structure is used in a bendable device, such as, a flexible display panel or a foldable the display panel, the backboard support structure can not only provide support and protection, but also provide a certain mechanical buffer and protection, e.g., reducing the force received by the display structure of the display panel and avoiding stress concentration in the display panel, thereby avoiding damages to the display panel during bending.

For instance, in some examples, the backboard support structure can further comprise a protection film 104, and the protection film 104 is disposed on the side of the adhesive layer 102 away from the substrate support film 101, and is e.g., a release film, so that the structure and morphology of the adhesive layer 102 will not be affected upon removal of the protection film 104. Thus, the protection film 104 can provide support when the backboard support structure is not bonded to a device such as the display panel. When the backboard support structure is bonded to a device such as the display panel, the backboard support structure can be bonded to the device via the adhesive layer 102 after removal of the protection film 104.

For instance, in some examples, the substrate support film 101 can have a thickness of about 20 μm-60 μm. If the thickness of the substrate support film 101 is too large, e.g., greater than about 60 μm, it is neither beneficial to the thin design of the backboard support structure, nor beneficial to the bending operation of the backboard support structure; and if the thickness of the substrate support film 101 is too small, e.g., lower than about 20 μm, the substrate support film 101 is hard to achieve support and protection. For instance, in some examples, the thickness of the substrate support film 101 can be selected as 30 μm-50 μm, e.g., 30 μm, 35 μm, 40 μm, 45 μm or 50 μm, etc.

For instance, the adhesive layer 102 can have a thickness of about 10 μm-50 μm. If the thickness of the adhesive layer 102 is too large, e.g., greater than about 50 μm, it is neither beneficial to the thin design of the backboard support structure, nor beneficial to the bending operation of the backboard support structure; and if the thickness of the adhesive layer 102 is too small, e.g., lower than about 10 μm, the adhesive layer 102 is prone to produce poor adhesion and other failure phenomena. For instance, in some examples, the thickness of the adhesive layer 102 can be selected as 20 μm-40 μm, e.g., 20 μm, 25 μm, 30 μm, 35 μm or 40 μm, etc.

For instance, in some examples, other properties of the substrate support film 101 can also be designed to further improve the overall performance of the backboard support structure. For instance, the substrate support film 101 can have an elongation at break of about 5%-80%, e.g., 10%, 20%, 30%, 50% or 70%, etc. For instance, the substrate support film 101 can have a bending strength of greater than about 160 Mpa, e.g., 170 Mpa, 180 Mpa or 190 Mpa, etc. For instance, the substrate support film 101 can have a moisture absorption of lower than about 2%, e.g., 0.5%, 1% or 1.5%, etc. When the substrate support film 101 has the aforesaid properties, the backboard support structure can not only provide a certain mechanical buffer and protection during the bending process, but also maintain a certain stability, so that it will not produce undesired deformation due to bending or environmental factors (e.g., moisture).

For instance, in some examples, the substrate support film 101 has a modulus of elasticity of about 5 Gpa-10 Gpa, e.g., 6 Gpa, 7 Gpa, 8 Gpa or 9 Gpa and a thickness of about 20 μm-40 μm, e.g., 25 μm, 30 μm or 35 μm, etc. The adhesive layer 102 has a modulus of elasticity of about 150 Kpa-250 Kpa, e.g., 150 Kpa, 180 Kpa, 200 Kpa or 230 Kpa, etc., and a thickness of about 10 μm-20 μm, e.g., 12 μm, 15 μm or 18 μm, etc.

For instance, in some examples, the substrate support film 101 has a modulus of elasticity of about 5 Gpa-10 Gpa, e.g., 6 Gpa, 7 Gpa, 8 Gpa or 9 Gpa, etc., and a thickness of about 40 μm-60 μm, e.g., 45 μm, 50 μm or 55 μm, etc. The adhesive layer 102 has a modulus of elasticity of about 150 Kpa-250 Kpa, e.g., 150 Kpa, 180 Kpa, 200 Kpa or 230 Kpa, etc., and a thickness of about 10 μm-20 μm, e.g., 12 μm, 15 μm or 18 μm, etc.

For instance, in some examples, the substrate support film 101 has a modulus of elasticity of about 1 Gpa-5 Gpa, e.g., 2 Gpa, 3 Gpa, 4 Gpa or 5 Gpa, etc., and a thickness of about 40 μm-60 μm, e.g., 45 μm, 50 μm or 55 μm, etc. The adhesive layer 102 has a modulus of elasticity of about 1 Kpa-150 Kpa, e.g., 10 Kpa-150 Kpa, e.g., 10 Kpa, 30 Kpa, 50 Kpa, 80 Kpa, 100 Kpa or 120 Kpa, etc., and a thickness of about 20 μm-50 μm, e.g., 30 μm, 35 μm or 40 μm, etc.

For instance, in some examples, the substrate support film 101 has a modulus of elasticity of about 1 Gpa-5 Gpa, e.g., 2 Gpa, 3 Gpa, 4 Gpa or 5 Gpa, etc., and a thickness of about 40 μm-60 μm, e.g., 45 μm, 50 μm or 55 μm, etc. The adhesive layer 102 has a modulus of elasticity of about 1 Kpa-150 Kpa, e.g., 10 Kpa-150 Kpa, e.g., 10 Kpa, 30 Kpa, 50 Kpa, 80 Kpa, 100 Kpa or 120 Kpa, etc., and a thickness of about 10 μm-20 μm, e.g., 12 μm, 15 μm or 18 μm, etc.

After testing, the coordination between the aforesaid substrate support film 101 and the adhesive layer 102 can allow the backboard support structure as a whole to have good mechanical property, e.g., good bending recovery, resistance to deformation, and bending strength, etc. For instance, when a backboard support structure comprising a substrate support film 101 with a modulus of elasticity of 1 Gpa-5 Gpa and an adhesive layer 102 with a modulus of elasticity of 1 Kpa-150 Kpa is used in a display panel, the backboard support structure can provide a better mechanical protection to the bent display panel, avoiding damages to the display panel during the bending process.

For instance, in some examples, the material of the substrate support film 101 comprises a polymeric material, such as, polyimide (e.g., polyimide comprising relatively more flexible segments) or polyterephthalate-based plastics (e.g., PET), etc. For instance, these materials have the above properties, or will have the above properties after treatment (such as modification). In addition, these materials can have a creep strain of lower than 0.5% under load stress, so that it is not prone to undesirable deformation.

For instance, in some examples, the substrate support film 101 falling within the aforesaid range can be formed from polyimide. For instance, the used polyimide has a modulus of elasticity of 1 Gpa-10 Gpa, e.g., 5 Gpa, and a thickness of 20 µm-60 µm, e.g., 40 µm, an elongation at break of 5%-80%, e.g., 30%, a bending strength of greater than 160 Mpa, e.g., 180 Mpa, and a moisture absorption of lower than 2%, e.g., 1%. Meanwhile, the used polyimide itself can have the aforesaid properties or have the aforesaid properties after undergoing an appropriate treatment, e.g., UV modification, etc.

For instance, in some examples, the substrate support film 101 falling within the aforesaid range can also be formed from PET. For instance, the used PET has a modulus of elasticity of 1 Gpa-10 Gpa, e.g., 6 Gpa, a thickness of 20 µm-60 µm, e.g., 30 µm, an elongation at break of 5%-80%, e.g., 30%, a bending strength of greater than 160 Mpa, e.g., 170 Mpa, and a moisture absorption of lower than 2%, e.g., 0.5%. For instance, the used PET itself can have the aforesaid properties, or have the aforesaid properties after undergoing an appropriate treatment, e.g., UV modification, etc.

For instance, in some examples, the material of the adhesive layer 102 can comprise an acrylate-based adhesive. Acrylate-based adhesives have good adhesivity, and can have the desired mechanical parameters. For instance, the adhesive layer 102 has an adhesive force greater than 500 gf/Inch so as to ensure the reliability of the backboard support structure.

For instance, in some examples, the adhesive layer 102 falling within the aforesaid range can be formed from an acrylate. For instance, the used acrylate has a modulus of elasticity of 1 Kpa-250 Kpa, e.g., 100 Kpa, a thickness of 10 µm-50 µm, e.g., 30 µm, and an adhesive force of greater than 500 gf/Inch, e.g., 700 gf/Inch.

For instance, in some examples, the backboard support structure need to be bent at some positions, and thus the backboard support structure can be subject to a regionalized design so as to deal with the bending operation of backboard support in a targeted manner.

Figure 2A:
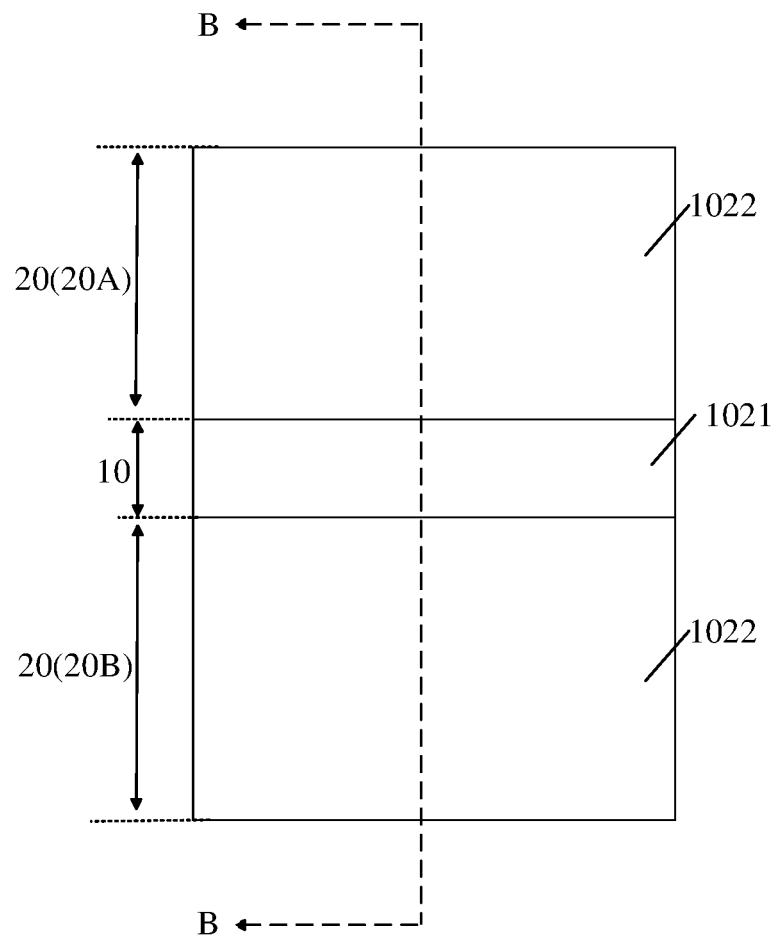
FIG. 2A is a planar schematic view of a backboard support structure provided in at least an embodiment of the present disclosure.
Figure 2B:
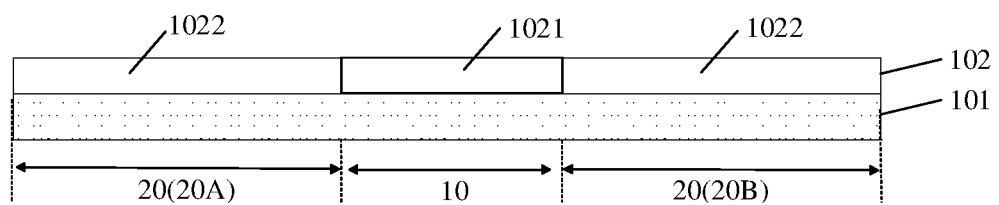
FIG. 2B is a cross-sectional schematic view along the line B-B of the backboard support structure as shown in FIG.

For instance, FIG. 2A is a planar schematic view showing a backboard support structure provided in at least an embodiment of the present disclosure, and FIG. 2B is a cross-sectional schematic view along the line B-B of the backboard support structure as shown in FIG. 2A. As shown in FIG. 2A and FIG. 2B, the backboard support structure comprises a first bendable region 10 and a first non-bent region 20. The first bendable region 10 can be e.g. disposed in a position required to be bent, such as, the middle portion of the backboard support structure, and configured to be bendable. For instance, the first non-bent region 20 comprises a first non-bent sub-region 20A and a second non-bent sub-region 20B, and a first bendable region 10 is located in the first non-bent sub-region 20A and the second non-bent sub-region 20B. The adhesive layer 102 comprises a first portion 1021 located in the first bendable region 10 and the second portion 1022 located in the first non-bent region 20.

For instance, the modulus of elasticity of the first portion 1021 is lower than the modulus of elasticity of the second portion 1022. Thus, when the first bendable region 10 is bent, it is prone to conduct the bending operation due to the lower modulus of elasticity of the first portion 1021, and can better adapt to the shape change caused by bending. Moreover, the second portion 1022 located in the first non-bent region 20 has a relatively high modulus of elasticity, does not need to be bent, and maintains its state when the first bendable region 10 is bent, and thus it can provide better support and protection.

For instance, in some examples, the first portion 1021 can have a modulus of elasticity of about 1 Kpa-150 Kpa, e.g., 10 Kpa, 50 Kpa, 80 Kpa, 100 Kpa or 120 Kpa, etc., and the second portion 1022 can have a modulus of elasticity of about 150 Kpa-250 Kpa, e.g., 180 Kpa, 200 Kpa or 220 Kpa, etc. Thus, by regionalized designs of the modulus of elasticity of the first portion 1021 located in the first bendable region 10 and the second portion 1022 located in the first non-bent region 20 of the adhesive layer 102, the backboard support structure can deal with the bending operation in a targeted manner. And in the case that a plurality of bending operations are performed or in the case that the bending radius is relatively small, the backboard support structure can avoid break and can further retain a certain stability and reliability.

For instance, in other examples of the present disclosure, the backboard support structure can comprise more bending regions and non-bent regions, and the embodiments of the present disclosure do not limit the number of the bendable region(s) and the non-bent region(s). For instance, these bendable region(s) and non-bent region(s) can be subject to the regionalized design as described above.

Figure 3A:
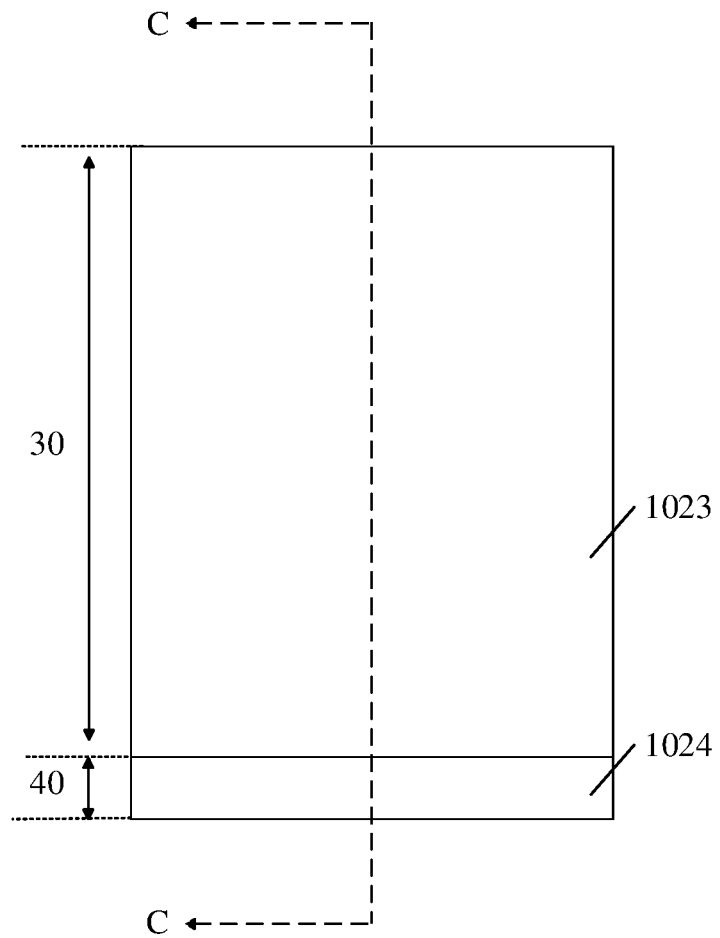
FIG. 3A is a planar schematic view of a backboard support structure provided in at least an embodiment of the present disclosure.
Figure 3B:
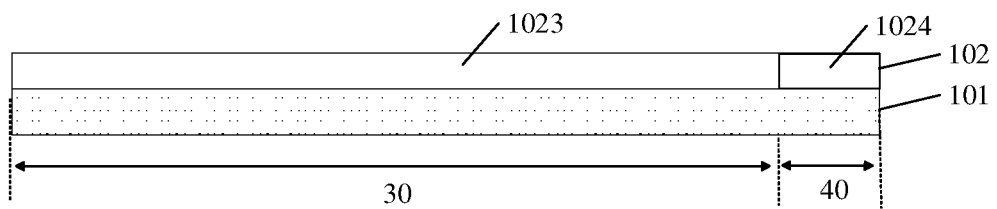
FIG. 3B is a cross-sectional schematic view along the line C-C of the backboard support structure as shown in FIG. 3A.

For instance, FIG. 3A is a planar schematic view showing a backboard support structure provided in at least an embodiment of the present disclosure, and FIG. 3B is a cross-sectional schematic view along the line C-C of the backboard support structure as shown in FIG. 3A. As shown in FIG. 3A and FIG. 3B, the backboard support structure further comprises a body region 30 and a peripheral region 40. For instance, when the backboard support structure is used in a device such as the display panel, etc., the body region 30 can correspond to the working region of the device, e.g., the display region of the display panel, and the peripheral region 40 can corresponding to the circuit bonding region, e.g., the bonding region of the display panel, which is used to bond a drive circuit for driving the display, etc. Meanwhile, the body region 30 and the peripheral region 40 of the backboard support structure can also be subject to a regionalized design to adapt the structural design of the device set on the backboard support structure at different locations.

For instance, the adhesive layer 102 can further comprise a third portion 1023 located in the body region 30 and a fourth portion 1024 located in the peripheral region 40. For instance, the modulus of elasticity of the third portion 1023 is lower than the modulus of elasticity of the fourth portion 1024. Meanwhile, the fourth portion 1024 located in the peripheral region 40 of the adhesive layer 102 has a relatively high modulus of elasticity, and thus the fourth portion 1024 has a relatively high mechanical strength, thereby avoiding the deformation of the adhesive material of the fourth portion 1024, e.g., collapse. For instance, when the bonding region of the display panel is correspondingly disposed in the peripheral region 40 of the backboard support structure, the aforesaid regionalized design of the backboard support structure can avoid the poor circuit bonding of the bonding region, thereby improving the reliability of the device.

For instance, in some examples, the third portion 1023 of the adhesive layer 102 can have a modulus of elasticity of about 1 Kpa-150 Kpa, e.g., 10 Kpa, 30 Kpa, 50 Kpa, 70 Kpa, 80 Kpa or 100 Kpa, etc., and the fourth portion 1024 can have a modulus of elasticity of about 150 Kpa-250 Kpa, e.g., 150 Kpa, 180 Kpa, 200 Kpa or 230 Kpa, etc. By regionalized design of the modulus of elasticity of the third portion 1023 located in the body region 30 and the fourth portion 1024 located in the peripheral region 40 of the adhesive layer 102, the backboard support structure can better match the working region of a device such as the display panel (e.g., the display region) and the peripheral region (e.g., the circuit bonding region) so as to providing the desired mechanical properties to various regions in targeted manner, thereby improving the reliability of the device.

Figure 4A:
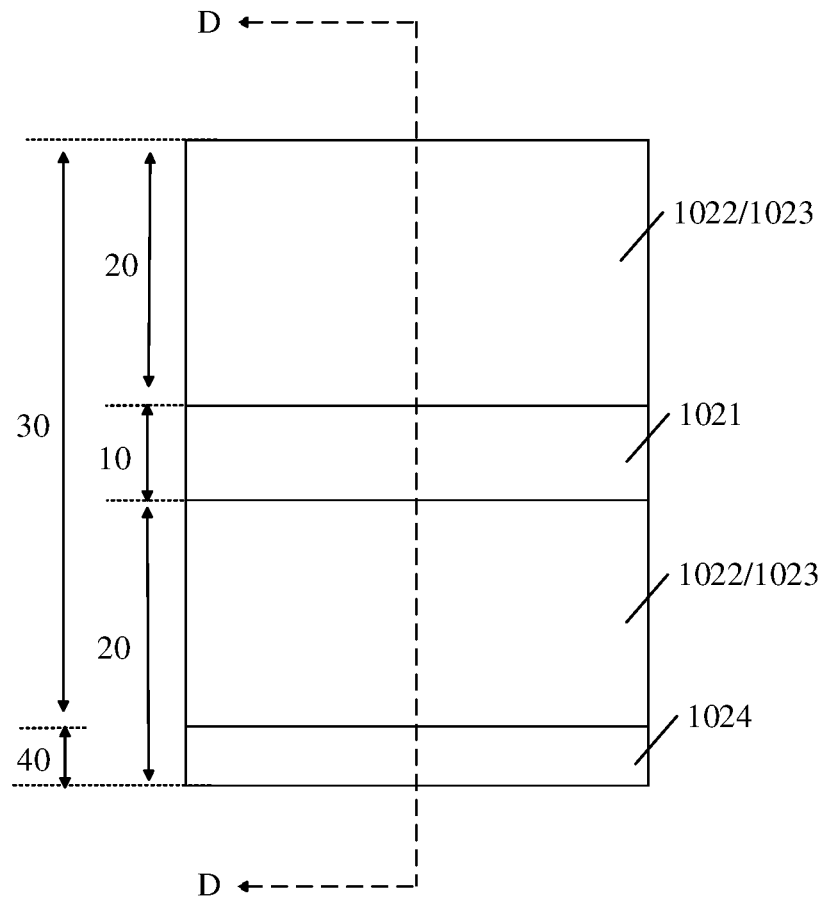
FIG. 4A is a planar schematic view of a backboard support structure provided in at least an embodiment of the present disclosure.
Figure 4B:
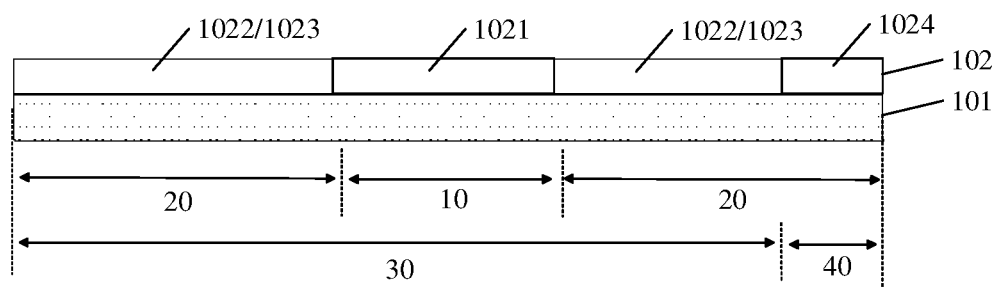
FIG. 4B is a cross-sectional schematic view along the line D-D of the backboard support structure as shown in FIG. 4A.

For instance, FIG. 4A is a planar schematic view showing a backboard support structure provided in at least an embodiment of the present disclosure, and FIG. 4B is a cross-sectional schematic view along the line D-D of the backboard support structure as shown in FIG. 4A. As shown in FIG. 4A and FIG. 4B, the backboard support structure simultaneously comprises a first bendable region 10, a first non-bent region 20, a body region 30 and a peripheral region 40, all of which are subject to regionalized design as described above so as to further improve the overall property of the backboard support structure. For instance, the peripheral region 40 is located in the first non-bent region 20, and the body region 30 is located in regions of the first bendable region 10 and the first non-bent region 20 other than the peripheral region 40. The adhesive layer comprises a first portion 1023 located in the first bendable region, the fourth portion 1024 located in the peripheral region, and regions 1022/1023 other than the first portion 1021 and the fourth portion 1024. The first portion has a modulus of elasticity of about 1 Kpa-150 Kpa, the fourth portion has a modulus of elasticity of about 150 Kpa-250 Kpa, and regions 1022/1023 of the adhesive layer other than the first portion 1021 and the fourth portion 1024 have a modulus of elasticity of about 1 Kpa-250 Kpa.

For instance, in some examples, the body region 30 and the peripheral region 40 of the backboard support structure can be subject to a regionalized design in an alternative manner.

Figure 5:
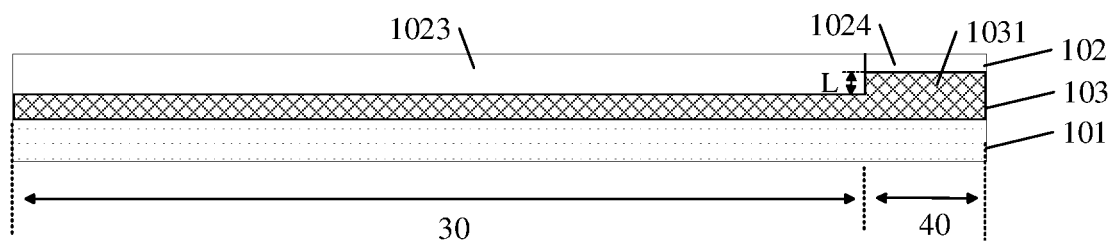
FIG. 5 is another cross-sectional schematic view along the line C-C of the backboard support structure as shown in FIG. 3A.

For instance, FIG. 5 is another cross-sectional schematic view along the line C-C of the backboard support structure as shown in FIG. 3A. As shown in FIG. 5, the backboard support structure can further comprise a spacing layer 103 disposed between the adhesive layer 102 and the substrate support film 101 and comprising a protrusion structure 1031 located in the peripheral region 40 and protruding towards the adhesive layer 102. Meanwhile, the surface of the adhesive layer 102 away from spacing layer 103 is a flat surface. Thus, the thickness of the fourth portion 1024 located in the peripheral region 40 of the adhesive layer 102 can be decreased so as to reduce the deformation risk (e.g., collapse risk) of the fourth portion 1024, thereby improving the reliability of the device.

For instance, in some examples, the protrusion structure 1031 can have a flat surface (as shown in the drawings). In other examples, the protrusion structure 1031 can also have a patterned surface, e.g., a concavo-convex surface, a height gradient surface, or a periodically changed, wedge-shaped surface, etc. The embodiments of the present disclosure do not limit the specific shapes of the protrusion structure 1031.

For instance, in some examples, the spacing layer 103 can have a modulus of elasticity of about 1 Gpa-4 Gpa, e.g., 2 Gpa, 2.5 Gpa or 3 Gpa, etc. Meanwhile, the modulus of elasticity of the spacing layer 103 is greater the modulus of elasticity of the fourth portion 1024 located in the peripheral region 40 of the adhesive layer 102, so that the spacing layer 103 can further provides a certain mechanical strength, thereby avoiding any unnecessary deformation. For instance, the material of the spacing layer 103 can be polyimide, e.g., thermoplastic polyimide (TPI). Thus, the spacing layer 103 can be formed on the substrate support film 101 by means of thermo compression molding.

For instance, in some examples, the substrate support film 104 can have a thickness of 20 µm-60 µm, e.g., 30 µm, 40 µm or 50 µm, etc. The adhesive layer can have a thickness of 20 µm-40 µm, e.g., 25 µm, 30 µm or 35 µm, etc. The protrusion structure 1031 can have a protrusion height L of is about 10 µm-20 µm, e.g., 10 µm or 15 µm, etc. Meanwhile, the thickness reduction of the fourth portion 1024 located in the peripheral region 40 of the adhesive layer 102 equals to the protrusion height L of the protrusion structure 1031.

For instance, in some examples, when the protrusion height L of the protrusion structure 1031 is 10 µm, and the thickness of the third portion 1023 located in the body region 30 of the adhesive layer 102 is 30 µm, the fourth portion 1024 located in the peripheral region 40 of the adhesive layer 102 has a thickness of 20 µm, that is, the thickness of the fourth portion 1024 is reduced by 10 µm, thereby reducing the deformation risk (e.g., collapse risk) of the fourth portion 1024 located in the peripheral region 40 of the adhesive layer 102.

By designs of various properties of the substrate support film and the adhesive and regionalized designs of the substrate support film and the adhesive layer, the backboard support structure provided in at least an embodiment of the present disclosure allows the backboard support structure to have a more superior comprehensive property and be used in a device including a display panel, etc., e.g., a device such as a foldable display panel, etc., thereby improving the stability and reliability of the device.

Figure 6A:
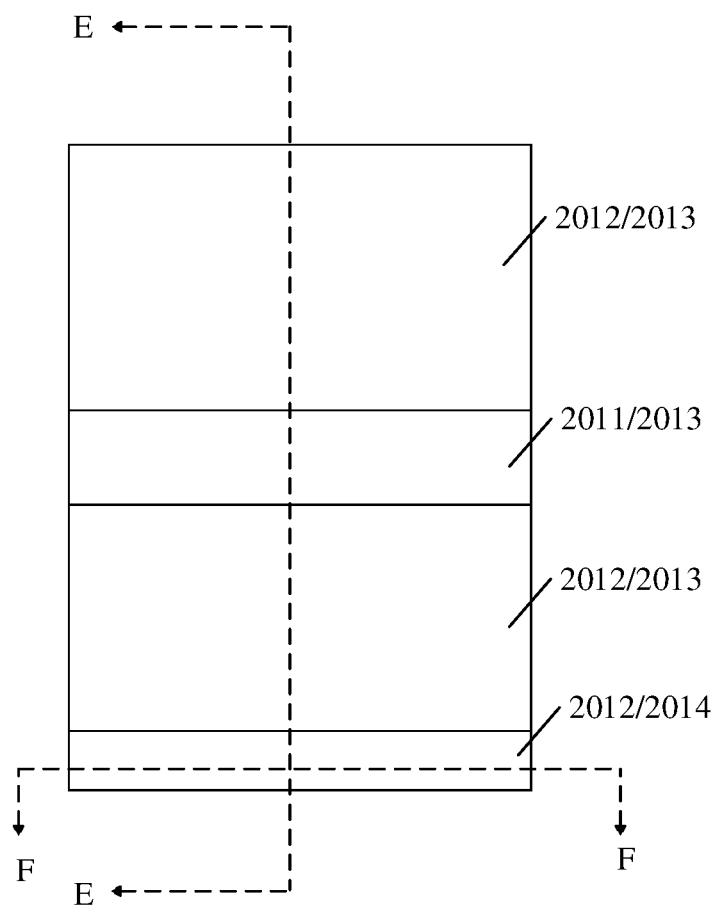
FIG. 6A is a planar schematic view of the display device provided in at least an embodiment of the present disclosure.
Figure 6B:
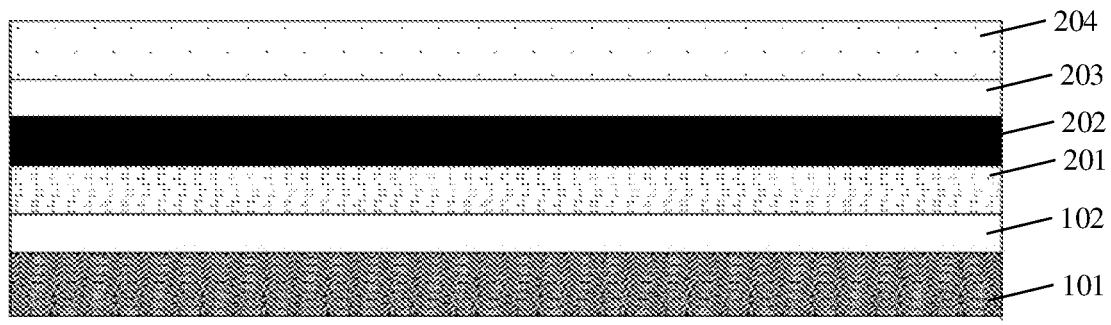
FIG. 6B is a cross-sectional schematic view along the line E-E of the display device as shown in FIG. 6A.

At least an embodiment of the present disclosure further provides a display device. FIG. 6A is a planar schematic view of display device, and FIG. 6B is a cross-sectional schematic view along the line E-E of the display device as shown in FIG. 6A. As shown in FIG. 6A and FIG. 6B, the display device comprises a display substrate 201 and any one of the backboard support structures as described above. The backboard support structure can be bonded to the non-display side of the display substrate 201 (the lower side as shown in the drawings).

For instance, the display device further comprises other functional structures, and the embodiments of the present disclosure do not limit thereto. For instance, a polarizer 202, a cover plate 204, and the like can also be disposed on the display side of the display substrate 201. For instance, the cover plate 204 is bonded to the display substrate 201 via another adhesive layer 203.

Figure 7:
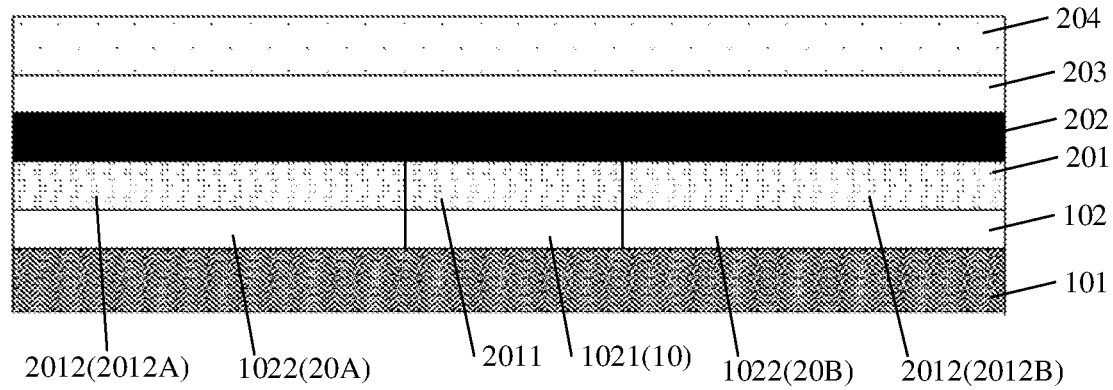
FIG. 7 is another cross-sectional schematic view along the line E-E of the display device as shown in FIG. 6A.

For instance, FIG. 7 is another cross-sectional schematic view along the line E-E of the display device as shown in FIG. 6A. As shown in FIG. 7, the display substrate 201 can be a foldable display substrate comprising a second bendable region 2011 and a second non-bent region 2012. For instance, the backboard support structure comprises a first bendable region 10 and a first non-bent region, the first bendable region 10 and the second bendable region 2011 are correspondingly arranged in a laminated manner, and the first non-bent region and the second non-bent region 2012 are correspondingly arranged in a laminated manner. Namely, when the backboard support structure and the display substrate 201 are bonded, the first portion 1021 located in the first bendable region 10 of the adhesive layer 102 is correspondingly attached to the second bendable region 2011 of display substrate 201, and the second portion 1022 located in the first non-bent region of the adhesive layer 102 is correspondingly attached to the second non-bent region 2012 of the display substrate 201. Thus, when the foldable display substrate is bent, the backboard support structure can provide a certain mechanical buffer and protection, alleviating the force received by the foldable display substrate during the bending process, e.g., reducing the force received by the display structure of the display substrate during the bending process and uniformly distributing the force so as to avoid the production of stress concentration, thereby improving the stability and reliability of the display device.

For instance, the first non-bent region comprises a first non-bent sub-region 20A and a second non-bent sub-region 20B; the first bendable region 1021 is located between the first non-bent sub-region 20A and the second non-bent sub-region 20B. The second non-bent region 2012 comprises a third non-bent sub-region 2012A and a fourth non-bent sub-region 2012B; the second bendable region 2011 is located between the third non-bent sub-region 2012A and the fourth non-bent sub-region 2012B. The first non-bent sub-region 20A and the third non-bent sub-region 2012A are correspondingly arranged in a laminated manner, and the second non-bent sub-region 20B and the fourth non-bent sub-region 2012B are correspondingly arranged in a laminated manner. Thus, the display device can be subject to bending operation in the middle thereof.

Figure 8:
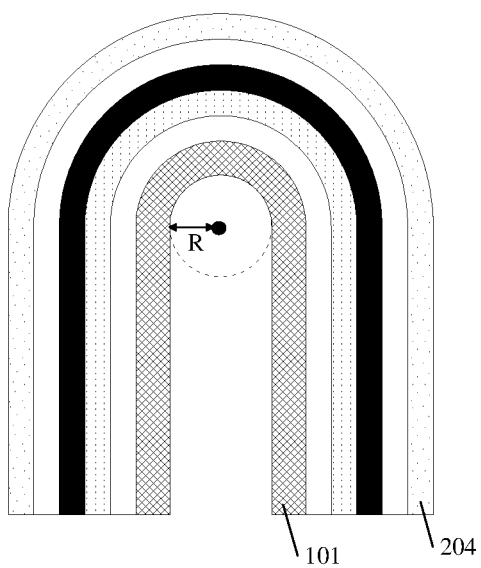
FIG. 8 is a cross-sectional schematic view of the display device provided in at least an embodiment of the present disclosure after bending.

For instance, under the action of the backboard support structure, the display device can undergo bending in various directions and at various scales, and can further maintaining a certain stability and reliability. For instance, in some examples, as shown in FIG. 8, the display device can undergo bending including the backboard support structure. For instance, in other examples, the display device can also undergo bending excluding the backboard support structure (that is, in a direction opposite to the bending direction as shown in FIG. 8). For instance, the display device can have a bending radius R in a wider range. For instance, the display device can be bent with a small radius to improve the bending effect of the display device.

Figure 9:
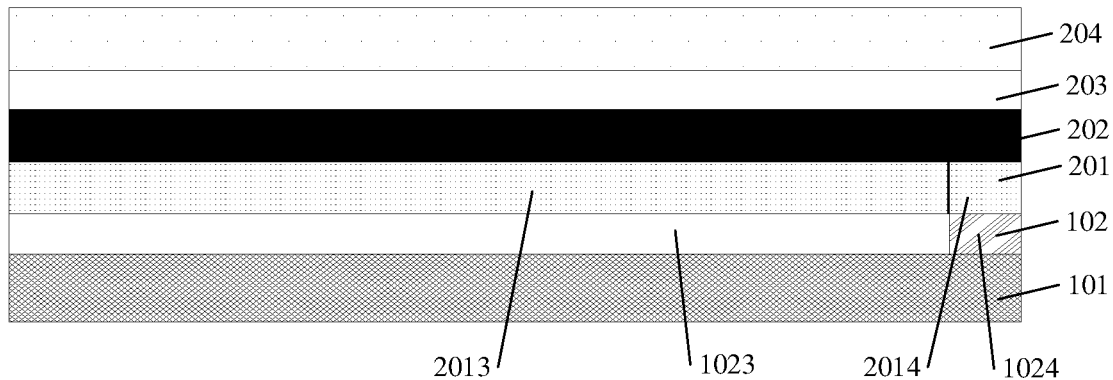
FIG. 9 is still another cross-sectional schematic view along the line E-E of the display device as shown in FIG. 6A.

For instance, FIG. 9 is still another cross-sectional schematic view along the line E-E of the display device as shown in FIG. 6A. As shown in FIG. 9, the display substrate 201 further comprises a display region 2013 and a bonding region 2014. For instance, the backboard support structure further comprises a body region and a peripheral region, both of which can be subject to regionalized design as described in the above examples. For instance, FIG. 9 shows the circumstance that the modulus of elasticity of the third portion 1023 is lower than the modulus of elasticity of the fourth portion 1024. Meanwhile, the display region 2013 and the body region are correspondingly arranged in a laminated manner, and the bonding region 2014 and the peripheral region are correspondingly arranged in a laminated manner. That is, when the backboard support structure and the display substrate 201 are bonded, the third portion 1023 located in the body region of the adhesive layer 102 is correspondingly attached to the display region 2013 of the display substrate 201, and the fourth portion 1024 located in the peripheral region of the adhesive layer 102 is correspondingly attached to the bonding region 2014 of display substrate 201. Thus, it can improve the reliability of the bonding circuit in the bonding region 2014 of the display substrate 201, and avoid the poor bonding of the bonding circuit caused by deformation, collapse, and the like of the adhesive.

Figure 10:
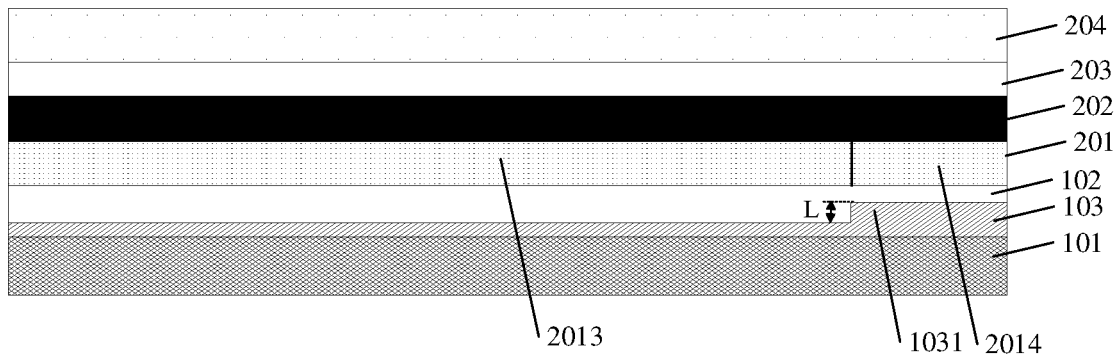
FIG. 10 is yet another cross-sectional schematic view along the line E-E of the display device as shown in FIG. 6A.

For instance, FIG. 10 is yet another cross-sectional schematic view along the line E-E of the display device as shown in FIG. 6A. As shown in FIG. 10, when the backboard support structure comprises a spacing layer 103, the body region and the peripheral region of the backboard support structure are correspondingly arranged in the display region 2013 and the bonding region 2014 of display substrate 201 in a laminated manner, respectively. Meanwhile, the protrusion structure 1031 of the spacing layer 103 corresponds to the bonding region 2014 of display substrate 201. This settings can also produce the technical effect of improving the reliability of the bonding circuit in the bonding region 2014, etc.

Figure 11:
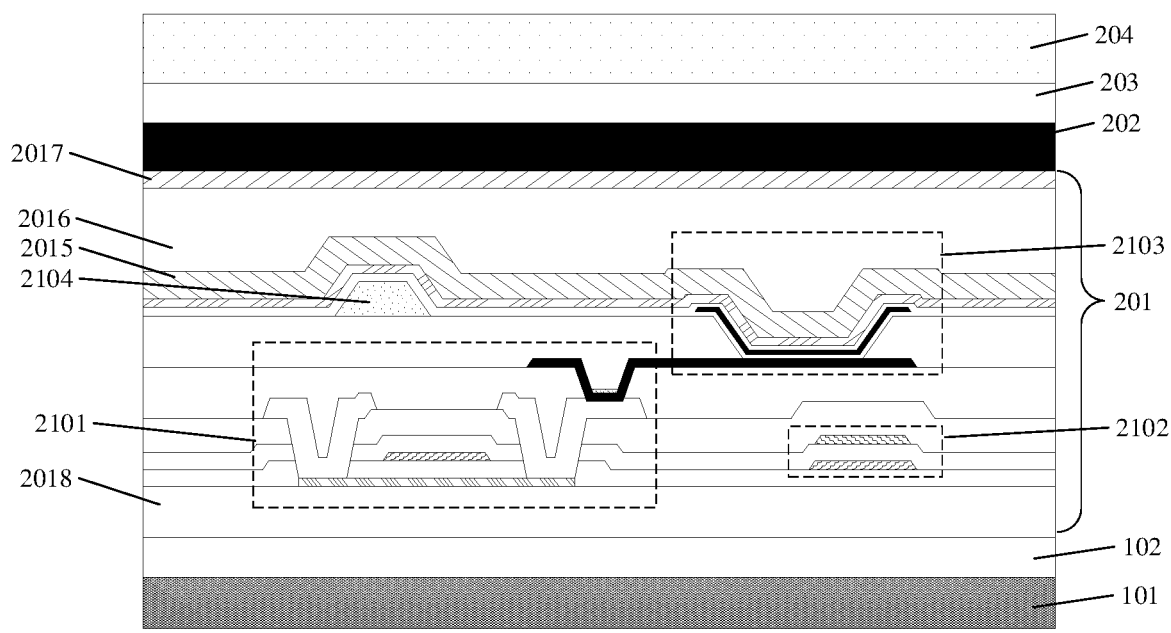
FIG. 11 is a cross-sectional schematic view of the display region of the display device provided in at least an embodiment of the present disclosure.

For instance, the display device can further comprise other functional structures. For instance, FIG. 11 shows a partial cross-sectional schematic view of the display region of the display device provided in at least an embodiment of the present disclosure. For instance, the display region of the display device comprises a pixel array including a plurality of pixel units; each pixel unit comprises a pix driving circuit and a light emitting element. The pixel driving circuit can drive the light emitting element to emit light so as to achieve the display function. For instance, FIG. 11 shows a cross-sectional schematic view of a pixel unit in the display region of the display device.

As shown in FIG. 11, the display substrate 201 comprises a pixel driving circuit for driving a pixel unit, which comprises, e.g., a transistor 2101 disposed on a substrate 2018 and a capacitor 2102, and the like. For instance, the transistor 2101 is a thin film transistor comprising a grid, an active layer, and source and drain electrodes, etc. For instance, the display substrate 201 further comprises a light emitting element 2103 which can be e.g., an organic light-emitting device (OLED) or a quantum dot light-emitting device (QLED), etc. For instance, the light emitting element 2103 comprises a first electrode (e.g., cathode), a second electrode (e.g., anode) and a light emitting layer (e.g., organic light emitting layer or quantum dot light emitting layer) between the first electrode and the second electrode, etc. When an appropriate voltage is applied across the first electrode and the second electrode, the light emitting layer emits light. For instance, a source electrode or a drain electrode of the transistor 2101 is electrically connected to an electrode of the light emitting element 2103, thereby transmitting a driving voltage to the light emitting element 2103. For instance, the display substrate 201 can further comprise a spacing layer 2104 and a sealing layer, or the like.

For instance, the sealing layer comprises a multilayer structure, e.g., it comprises a first inorganic encapsulation layer 2015, a second organic encapsulation layer 2016, and a third inorganic encapsulation layer 2017 sequentially arranged in a laminate manner to provide a better sealing effect. For instance, a polarizer 202, a cover plate 204 (e.g., a glass cover plate), etc. are disposed on the display side of the display substrate 201. For instance, the cover plate 204 is bonded to the display substrate 201 via another adhesive layer 203. The embodiments of the present disclosure do not limit the specific structures of the display device and the display substrate.

For example, the encapsulation layer includes a multilayer structure. For example, the first inorganic encapsulation layer 2015, the second organic encapsulation layer 2016, and the third inorganic encapsulation layer 2017 are sequentially stacked to provide a better encapsulation effect. For example, the display side of the display substrate 201 is provided with a structure such as a polarizer 202 and a cover plate 204 (for example, a glass cover plate). For example, the cover plate 204 is bonded to the display substrate 201 via another adhesive layer 203. The embodiments of the present disclosure do not limit the specific structures of the display device and the display substrate.

Figure 12:
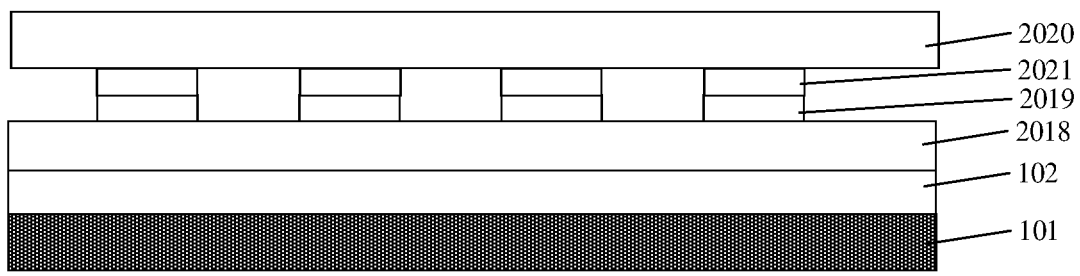
FIG. 12 is a cross-sectional schematic view of the bonding region of the display device provided in at least an embodiment of the present disclosure.

For instance, FIG. 12 shows a partial cross-sectional schematic view of the bonding region of the display device provided in at least an embodiment of the present disclosure. The schematic view is taken, e.g., along the line F-F in FIG. 6A. As shown in FIG. 12, the bonding region of the display device comprises a signal line 2019 disposed on the substrate 2018 which is electrically connected to the driving circuit of the display region of the display device to transmitting an electric signal. For instance, the substrate 2018 further has structures like a buffer layer, an insulating layer, and the like. The embodiments of the present disclosure do not limit thereto.

For instance, the bonding region of the display device can be bonded to a driving chip or a structure bearing a chip (e.g., a chip on film, COF or a flexible printed circuit board (FPC), etc. For instance, in some examples, as shown in FIG. 12, the COF comprises a flexible substrate 2020, a bonding signal line 2021 and a driving chip disposed on flexible substrate 2020 (not shown in the drawings). For instance, one end of the bonding signal line 2021 is electrically connected to the driving chip, and the other end is bonded to the signal line 2019 of the bonding region of the display device, so that the driving chip can be used to provide a driving signal to the display region of the display device via the bonding signal line 2021 and the signal line 2019. For instance, during the preparation process, the COF can be bonded to the bonding region of the display device in a crimping by means of adhesive (e.g., anisotropic conductive adhesive).

The display device provided in at least an embodiment of the present disclosure comprises the backboard support structure provided in provided in at least an embodiment of the present disclosure, which can provide a certain mechanical buffer and protection when the display device is bent so as to avoid any damage during the bending process of the display device, e.g., avoid damages to some functional structures in the display region caused by stress concentration at some positions of the display substrate. Thus, the backboard support structure can improve the stability and reliability of the display device.

Figure 13:
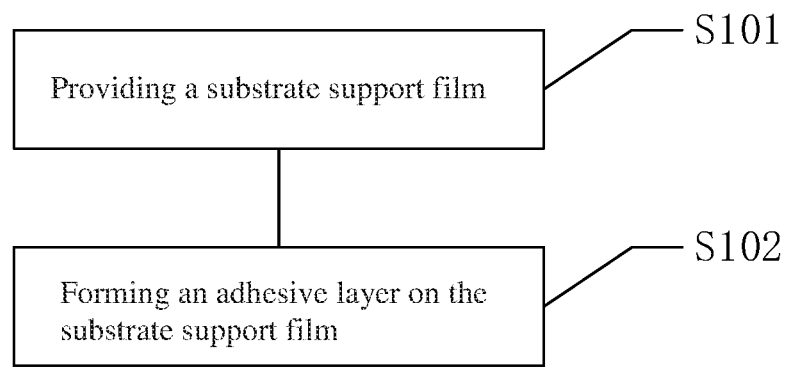
FIG. 13 is a flow chart of preparing the display device provided in at least an embodiment of the present disclosure.

At least an embodiment of the present disclosure provides a method of preparing a backboard support structure. As shown in FIG. 13, the method comprises the steps S101-S102.

Step S101: Providing a substrate support film.

For instance, the substrate support film has a modulus of elasticity of about 1 Gpa-10 Gpa, e.g., 2 Gpa, 4 Gpa, 5 Gpa, 6 Gpa or 8 Gpa, etc. The material of the substrate support film can be a polymeric material, e.g., polyimide (e.g., a polyimide comprising relatively more flexible segments) or polyterephthalate-based plastics (e.g., PET), etc. For instance, these materials have the aforesaid properties, or will have the aforesaid properties after treatment (e.g., modification). For instance, the substrate support film can be commercially available or synthesized, and the embodiments of the present disclosure do not limit thereto.

Step S102: Forming an adhesive layer on the substrate support film.

For instance, the adhesive layer has a modulus of elasticity of about 1 Kpa-250 Kpa, e.g., 10 Kpa, 30 Kpa, 50 Kpa, 80 Kpa, 120 Kpa, 150 Kpa or 200 Kpa, etc. The material of the adhesive layer can comprise an acrylate-based adhesive. This type of adhesives have good adhesion, and can have the desired mechanical parameters. For instance, the adhesive layer 102 has an adhesion of greater than 500 gf/Inch to ensure the reliability of the backboard support structure. For instance, the adhesive layer 102 can be formed on the substrate support film by means of coating or the like.

For instance, in some examples, referring to FIG. 2A and FIG. 2B, the backboard support structure comprises a first bendable region and a first non-bent region, and the adhesive layer comprises a first portion located in the first bendable region and a second portion located in the first non-bent region. Meanwhile, the method of preparing backboard support structure can further comprise: subjecting at least one of the first portion and the second portion to a modification treatment so that the modulus of elasticity of the first portion is lower than the modulus of elasticity of the second portion.

For instance, the second portion can be subject to a modification treatment to increase the modulus of elasticity of the second portion. For instance, in some examples, it can be subject to the modification treatment by means of UV radiation. For instance, the second portion can be radiated with UV light to undergo a UV curing enhancement to increase the modulus of elasticity of the second portion.

For instance, in some examples, the first portion can alternatively be subject to a modification treatment to decrease the modulus of elasticity of the first portion. For instance, in some examples, the first portion and the second portion can alternatively be subject to different modification treatments to increase the modulus of elasticity of the second portion and decrease the modulus of elasticity of the first portion, so that the modulus of elasticity of the first portion is lower than the modulus of elasticity of the second portion. The embodiments of the present disclosure do not limit in particular the treatments for the first portion and the second portion.

For instance, in the finally obtained adhesive layer, the first portion can have a modulus of elasticity of about 1 Kpa-150 Kpa, e.g., 10 Kpa, 80 Kpa, 100 Kpa or 120 Kpa, etc., and the second portion 1022 can have a modulus of elasticity of about 150 Kpa-250 Kpa, e.g., 180 Kpa, 200 Kpa or 220 Kpa, etc.

For instance, in some examples, referring to FIG. 3A and FIG. 3B, the backboard support structure further comprises a body region and a peripheral region, and the adhesive layer further comprises a third portion located in the body region and a fourth portion located in the peripheral region. Meanwhile, the method of preparing the backboard support structure can further comprise: subjecting at least one of the third portion and the fourth portion to a modification treatment so that the modulus of elasticity of the third portion is lower than the modulus of elasticity of the fourth portion.

For instance, the fourth portion can be subject to a modification treatment to increase the modulus of elasticity of the fourth portion. For instance, in some examples, it can be subject to the modification treatment by means of UV radiation. For instance, the fourth portion can be radiated with UV light to undergo a UV curing enhancement to increase the modulus of elasticity of the fourth portion.

For instance, in some examples, the third portion can alternatively be subject to the modification treatment to decrease the modulus of elasticity of the third portion. For instance, in some examples, the third portion and the fourth portion can alternatively be subject to different modification treatments to increase the modulus of elasticity of the fourth portion and decrease the modulus of elasticity of the third portion so that the modulus of elasticity of the third portion is lower than the modulus of elasticity of the fourth portion. The embodiments of the present disclosure do not limit in particular the treatments for the third portion and the fourth portion.

For instance, in the finally obtained adhesive layer, the third portion 1023 can have a modulus of elasticity of about 1 Kpa-150 Kpa, e.g., 10 Kpa, 30 Kpa, 50 Kpa, 70 Kpa, 80 Kpa or 100 Kpa, etc., and the fourth portion 1024 can have a modulus of elasticity of about 150 Kpa-250 Kpa, e.g., 150 Kpa, 180 Kpa, 200 Kpa or 230 Kpa, etc.

For instance, in some examples, referring to FIG. 5, the backboard support structure further comprises a body region and a peripheral region, and the backboard support structure further comprises a spacing layer. Meanwhile, the method of preparing the backboard support structure can further comprise forming a spacing layer on the substrate support film prior to the formation of the adhesive layer; the spacing layer comprise a protrusion structure located in the peripheral region, and the adhesive layer is formed on the side of the spacing layer away from the substrate support film, while the surface of the adhesive layer away from the spacing layer is formed to a flat surface.

For instance, the spacing layer 103 can have a modulus of elasticity of about 1 Gpa-4 Gpa, e.g., 2 Gpa, 2.5 Gpa or 3 Gpa, etc. For instance, the material of the spacing layer 103 can be polyimide, e.g., thermoplastic polyimide (TPI) so that the spacing layer can be formed by means of thermo compression molding. For instance, the spacing layer can be directly formed on the substrate support film by means of thermo compression molding.

For instance, during the process of thermo compression molding, the temperature of thermo compression molding can be selected in the vicinity of but not higher than the glass transition temperature Tg of the thermoplastic polyimide. For instance, when the glass transition temperature Tg of the selected thermoplastic polyimide is about 500° C., the temperature of thermo compression molding is selected as about 200° C.-300° C., e.g., 230° C., 250° C. or 280° C., etc. The pressure of thermo compression molding can be selected as, e.g., about 0.8 N-1.0 N, e.g., 0.9 N, etc. The time period of thermo compression molding can be selected as, e.g., about 10-30 second(s), e.g., 15 s, 20 s or 25 s, etc.

For instance, in other examples, the spacing layer can alternatively be formed by other means, e.g., formed by means of coating and curing or the like. The embodiments of the present disclosure do not limit the particular forming process of the spacing layer.

The backboard prepared by the method provided in the embodiments of the present disclosure has a superior comprehensive property, e.g., it can be used in a device such as a display panel, such as, a foldable the display panel, etc., to improve the stability and reliability of the device.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should be understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. A display device comprising a display substrate and a backboard support structure, wherein the backboard support structure comprises a substrate support film and an adhesive layer that are arranged in a laminated manner, and the backboard support structure is bonded to a non-display side of the display substrate via the adhesive layer, the backboard support structure comprises a first bendable region and a first non-bent region, and the adhesive layer comprises a first portion located in the first bendable region and a second portion located in the first non-bent region; the first portion has a modulus of elasticity of about 1 KPa-150 KPa, the second portion has a modulus of elasticity of about 150 KPa-250 KPa, and the substrate support film has a modulus of elasticity of about 1 GPa-10 GPa; and the display substrate is a foldable display substrate comprising a second bendable region and a second non-bent region, wherein the first bendable region and the second bendable region are correspondingly arranged in a laminated manner, and the first non-bent region and the second non-bent region are correspondingly arranged in a laminated manner, wherein the substrate support film has a thickness of about 20 μm-60 μm, and the adhesive layer has a thickness of about 10 μm-50 μm, wherein the backboard support structure comprises a body region and a peripheral region, the adhesive layer comprises a third portion located in the body region and a fourth portion located in the peripheral region, wherein the backboard support structure further comprises a spacing layer, the spacing layer is located between the adhesive layer and the substrate support film and is located in both of the body region and the peripheral region, and the spacing layer comprises a protrusion structure located in the peripheral region and protruding towards the adhesive layer, and a surface of the adhesive layer away from the spacing layer is a flat surface, so that a thickness of the fourth portion of the adhesive layer is smaller than a thickness of the third portion of the adhesive layer, wherein the spacing layer has a modulus of elasticity of about 1 GPa-4 GPa, and wherein the protrusion structure has a protrusion height of about 10 μm-20 μm.

2. The display device according to claim 1, wherein a material of the substrate support film comprises polyimide or PET.

3. The display device according to claim 1, wherein the first non-bent region comprises a first non-bent sub-region and a second non-bent sub-region, wherein the first bendable region is located between the first non-bent sub-region and the second non-bent sub-region, the second non-bent region comprises a third non-bent sub-region and a fourth non-bent sub-region, wherein the second bendable region is located between the third non-bent sub-region and the fourth non-bent sub-region, the first non-bent sub-region and the third non-bent sub-region are correspondingly arranged in a laminated manner, and the second non-bent sub-region and the fourth non-bent sub-region are correspondingly arranged in a laminated manner.

4. A backboard support structure comprising a substrate support film and an adhesive layer that are arranged in a laminated manner,
wherein the substrate support film has a modulus of elasticity of about 1 GPa-10 GPa, and the adhesive layer has a modulus of elasticity of about 1 KPa-250 KPa,
the backboard support structure comprises a first bendable region and a first non-bent region, and the adhesive layer comprises a first portion located in the first bendable region and a second portion located in the first non-bent region,
a modulus of elasticity of the first portion is lower than a modulus of elasticity of the second portion, and the first portion has a modulus of elasticity of about 1 KPa-30 KPa, and the second portion has a modulus of elasticity of about 150 KPa-250 KPa,
wherein the substrate support film has a thickness of about 20 μm-60 μm, and the adhesive layer has a thickness of about 10 μm-50 μm,
wherein the backboard support structure comprises a body region and a peripheral region, the adhesive layer comprises a third portion located in the body region and a fourth portion located in the peripheral region,
wherein the backboard support structure further comprises a spacing layer, the spacing layer is located between the adhesive layer and the substrate support film and is located in both of the body region and the peripheral region, and
the spacing layer comprises a protrusion structure located in the peripheral region and protruding towards the adhesive layer, and a surface of the adhesive layer away from the spacing layer is a flat surface, so that a thickness of the fourth portion of the adhesive layer is smaller than a thickness of the third portion of the adhesive layer,
wherein the spacing layer has a modulus of elasticity of about 1 GPa-4 GPa, and
wherein the protrusion structure has a protrusion height of about 10 μm-20 μm.

5. The backboard support structure according to claim 4, wherein the substrate support film has an elongation at break of about 5%-80%, the substrate support film has a bending strength of greater than about 160 MPa, and the substrate support film has a moisture absorption of lower than about 2%.

6. The backboard support structure according to claim 4, wherein the substrate support film has a modulus of elasticity of about 5 GPa-10 GPa and a thickness of about 20 μm-40 μm; and
the adhesive layer has a modulus of elasticity of about 150 KPa-250 KPa and a thickness of about 10 μm-20 μm.

7. The backboard support structure according to claim 4, wherein the substrate support film has a modulus of elasticity of about 1 GPa-5 GPa and a thickness of about 40 μm-60 μm; and
the adhesive layer has a modulus of elasticity of about 1 KPa-150 KPa and a thickness of about 20 μm-50 μm.

8. The backboard support structure according to claim 4, wherein the substrate support film has a modulus of elasticity of about 1 GPa-5 GPa and a thickness of about 40 μm-60 μm; and
the adhesive layer has a modulus of elasticity of about 1 KPa-150 KPa and a thickness of about 10 μm-20 μm.

9. The backboard support structure according to claim 4, wherein the substrate support film has a modulus of elasticity of about 5 GPa-10 GPa and a thickness of about 40 μm-60 μm; and
the adhesive layer has a modulus of elasticity of about 150 KPa-250 KPa and a thickness of about 10 μm-20 μm.

10. The backboard support structure according to claim 4, wherein
a modulus of elasticity of the third portion is lower than a modulus of elasticity of the fourth portion; and the third portion has a modulus of elasticity of about 1 KPa-150 KPa, and the fourth portion has a modulus of elasticity of about 150 KPa-250 KPa.

11. The backboard support structure according to claim 4, wherein
the peripheral region is located in the first non-bent region, the body region is located in regions of the first bendable region and the first non-bent region other than the peripheral region, and the adhesive layer further comprises portions other than the first portion and the fourth portion; and
the first portion has a modulus of elasticity of about 1 KPa-30 KPa, the fourth portion has a modulus of elasticity of about 150 KPa-250 KPa, regions of the adhesive layer other than the first portion and the fourth portion have a modulus of elasticity of about 1 KPa-250 KPa.

12. The backboard support structure according to claim 4, wherein the substrate support film has a thickness of about 20 μm-60 μm, the adhesive layer has a thickness of about 20 μm-40 μm.

13. A display device comprising a display substrate and the backboard support structure according to claim 8, wherein the backboard support structure is bonded to a non-display side of the display substrate via the adhesive layer.

14. A method of preparing a backboard support structure comprising:
providing a substrate support film; and
forming an adhesive layer on the substrate support film,
wherein the substrate support film has a modulus of elasticity of about 1 GPa-10 GPa, and the adhesive layer has a modulus of elasticity of about 1 KPa-250 KPa,
the backboard support structure comprises a first bendable region and a first non-bent region, and the adhesive layer comprises a first portion located in the first bendable region and a second portion located in the first non-bent region,
a modulus of elasticity of the first portion is lower than a modulus of elasticity of the second portion, and the first portion has a modulus of elasticity of about 1 KPa-30 KPa, and the second portion has a modulus of elasticity of about 150 KPa-250 KPa,
wherein the substrate support film has a thickness of about 20 μm-60 μm, and the adhesive layer has a thickness of about 10 μm-50 μm,
wherein the backboard support structure comprises a body region and a peripheral region, the adhesive layer comprises a third portion located in the body region and a fourth portion located in the peripheral region, wherein the backboard support structure further comprises a spacing layer, the spacing layer is located between the adhesive layer and the substrate support film and is located in both of the body region and the peripheral region, and the spacing layer comprises a protrusion structure located in the peripheral region and protruding towards the adhesive layer, and a surface of the adhesive layer away from the spacing layer is a flat surface, so that a thickness of the fourth portion of the adhesive layer is smaller than a thickness of the third portion of the adhesive layer, wherein the spacing layer has a modulus of elasticity of about 1 GPa-4 GPa, and wherein the protrusion structure has a protrusion height of about 10 μm-20 μm.

15. The method according to claim 14, further comprising:

subjecting at least one of the first portion and the second portion to a modification treatment so that the modulus of elasticity of the first portion is lower than the modulus of elasticity of the second portion.

16. The method according to claim 14, wherein the method further comprises:

subjecting at least one of the third portion and the fourth portion to a modification treatment so that a modulus of elasticity of the third portion is lower than a modulus of elasticity of the fourth portion.

17. The method according to claim 15, wherein the modification treatment is performed by means of UV radiation.

* * * * *